(12) United States Patent
Hong et al.

(10) Patent No.: US 9,829,922 B2
(45) Date of Patent: Nov. 28, 2017

(54) FLEXIBLE DISPLAY AND FIXING METHOD THEREOF

(71) Applicant: SAMSUNG DISPLAY CO., LTD., Yongin-si, Gyeonggi-Do (KR)

(72) Inventors: Jun Woo Hong, Yongin (KR); Hae Kwan Seo, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 157 days.

(21) Appl. No.: 14/223,004

(22) Filed: Mar. 24, 2014

(65) Prior Publication Data

US 2014/0321073 A1 Oct. 30, 2014

(30) Foreign Application Priority Data

Apr. 25, 2013 (KR) .......................... 10-2013-0046192

(51) Int. Cl.
*H05K 1/00* (2006.01)
*G06F 1/16* (2006.01)

(52) U.S. Cl.
CPC .................................. *G06F 1/1652* (2013.01)

(58) Field of Classification Search
CPC ..... G06F 1/1652; G09F 9/301; H04M 1/0268
See application file for complete search history.

(56) References Cited

U.S. PATENT DOCUMENTS

| | | | |
|---|---|---|---|
| 6,366,440 B1* | 4/2002 | Kung | E05C 19/16 361/147 |
| 9,189,028 B2* | 11/2015 | Nakhimov | G06F 1/1652 |
| 2006/0166713 A1* | 7/2006 | Yeh | G06F 1/1626 455/575.1 |
| 2008/0086925 A1* | 4/2008 | Yang | H04M 1/0268 40/610 |
| 2008/0158800 A1* | 7/2008 | Aoyagi | G06F 1/1616 361/679.01 |
| 2011/0227855 A1* | 9/2011 | Kim | G02F 1/13306 345/173 |
| 2013/0076652 A1* | 3/2013 | Leung | G06F 3/016 345/173 |
| 2013/0286551 A1* | 10/2013 | Ashcraft | G06F 1/1679 361/679.01 |
| 2014/0166992 A1* | 6/2014 | Hack | H01L 51/5253 257/40 |
| 2015/0268699 A1* | 9/2015 | Bathiche | G06F 1/1649 345/1.3 |

FOREIGN PATENT DOCUMENTS

| | | |
|---|---|---|
| KR | 10-2009-0006606 A | 1/2009 |
| KR | 10-2012-0073904 A | 7/2012 |
| KR | 10-2012-0093665 A | 8/2012 |
| KR | 10-2012-0095019 A | 8/2012 |

* cited by examiner

*Primary Examiner* — Yuriy Semenenko
(74) *Attorney, Agent, or Firm* — Lee & Morse, P.C.

(57) ABSTRACT

A flexible display includes a flexible substrate, a metal material coupled to the flexible substrate, and at least one electromagnet coupled to the flexible substrate. The electromagnet generates a force to attract the metal material when the flexible substrate changes from a first state to a second state. The force assists in holding the flexible substrate in the second state, which may be a rolled state, folded state, or another changed state. The flexible substrate includes a display area corresponding to a plurality of pixels for generating an image.

24 Claims, 16 Drawing Sheets

FLEXIBLE DISPLAY AND FIXING METHOD THEREOF

CROSS-REFERENCE TO RELATED APPLICATION

Korean Patent Application No. 10-2013-0046192, filed on Apr. 25, 2013, and entitled, "Flexible Display and Fixing Method Thereof," is incorporated by reference herein in its entirety.

BACKGROUND

1. Field

One or more embodiments described herein relate to a display.

2. Description of the Prior Art

Various types of flat panel displays have been developed to meet the information needs of a global society. Examples of flat panel displays include a liquid crystal display device (LCD), a plasma display panel device (PDP), a field emission display device (FED), and an electroluminescence display device (ELD). Because these displays are lighter in weight, thinner, and have low power consumption, they are rapidly replacing cathode ray tubes (CRTs).

SUMMARY

In accordance with one embodiment, a flexible display includes a flexible display panel having a non-display area adjacent a display area, the flexible display panel including at least one electromagnet in the non-display area; and a power supply to supply power to the flexible display panel. In one arrangement, a plurality of electromagnets may be positioned in opposing first and second sides of the non-display area.

Electromagnets positioned on the first side of the non-display area may be arranged in a first line and spaced from each other, electromagnets positioned on the second side of the non-display area may be arranged in a second line and spaced from each other, and the first line and the second line may be substantially parallel to each other. The plurality of electromagnets may be symmetrically arranged relative to the display area.

The flexible display panel may include at least one metal plate positioned in the non-display area, and the electromagnet and the metal plate may be positioned on different planes. The electromagnet may overlap the metal plate.

When the power is supplied to the electromagnet when the flexible display panel is in a rolled state, the electromagnet may generate a force to pull the metal plate to fix the flexible display panel in the rolled state.

The flexible display panel may include at least one metal plate positioned in the non-display area, and the electromagnet and the metal plate may be positioned on a same plane. The electromagnet may be positioned on one side of the non-display area, and the metal plate may be positioned on an opposing side of the non-display area.

When the power is supplied to the electromagnet when the flexible display panel is in a folded state, the electromagnet may generate a force to pull the metal plate to fix the flexible display panel in the folded state. An electromagnet driver may drive the electromagnet to adjust an amount of current applied to the electromagnet.

In accordance with another embodiment, a flexible display includes a flexible display panel and a power supply to supply power to the flexible display panel. The flexible display panel includes a flexible substrate and a device layer on the flexible substrate, the device layer including a first device layer and a second device layer that surrounds the first device layer, and the second device layer includes at least one electromagnet. The flexible display panel may include a non-display area around a display area, the first device layer may be positioned in the display area, and the second device layer may be positioned in the non-display area. The flexible substrate may include a metal material.

The flexible display panel may include at least one metal plate positioned in the non-display area, and the metal plate may be included in the flexible substrate. The flexible display panel may include the flexible substrate and a barrier layer between the flexible substrate and the device layer, and the electromagnet may overlap the metal plate. The flexible display panel may include an encapsulation layer on the device layer, and at least one of the electromagnet or the metal plate may be exposed to an external surface of the flexible display panel.

In accordance with one embodiment, a method for fixing a flexible display device includes changing a shape of a flexible display panel that includes at least one electromagnet; and supplying power to the electromagnet. The flexible display panel may include a non-display area around a display area, and the electromagnet may be positioned in the non-display area. The flexible display panel may include at least one metal plate, and changing the shape of the flexible display panel may include positioning the electromagnet to be adjacent to the metal plate that corresponds to the electromagnet.

In accordance with one embodiment, a display includes a flexible substrate, a metal material coupled to the flexible substrate, and at least one electromagnet coupled to the flexible substrate, wherein the electromagnet is to generate a force to attract the metal material when the flexible substrate changes from a first state to a second state, the force to assist in holding the flexible substrate in the second state, and wherein the flexible substrate includes a display area corresponding to a plurality of pixels. The metal material may be a plate or a material included in another electromagnet. The first state may be an open state and the second state may be a closed state.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
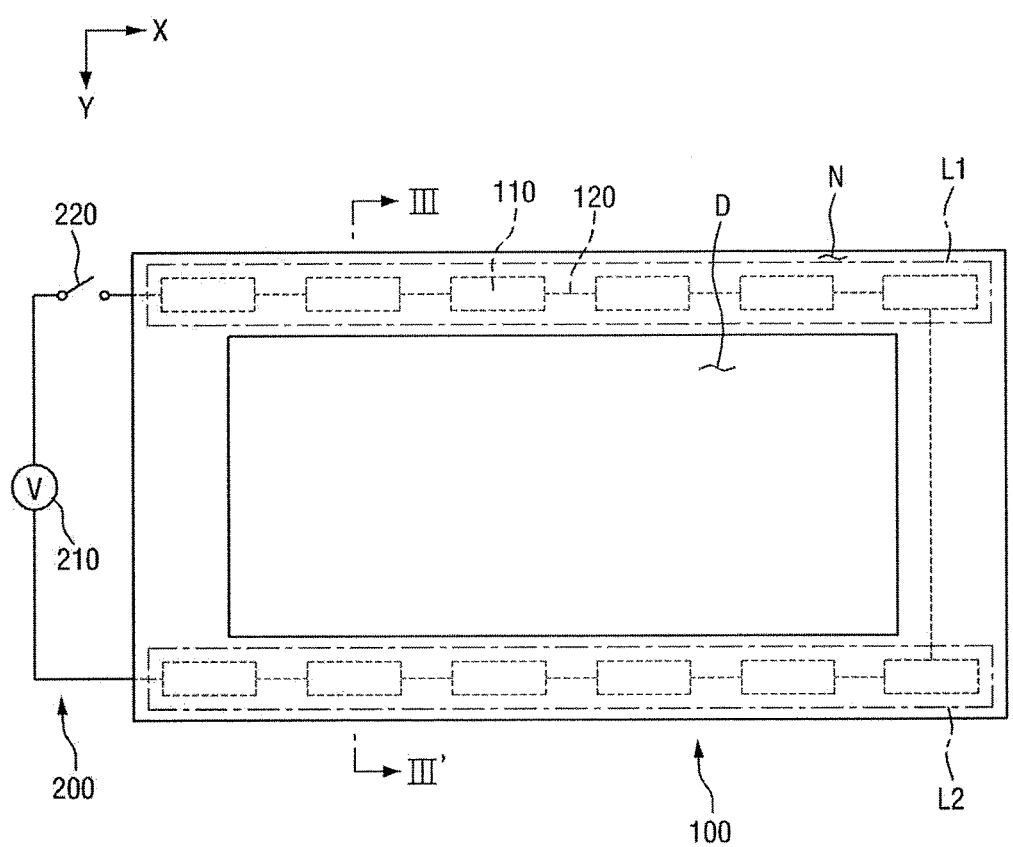
FIG. 1 illustrates one embodiment of a flexible display.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it may be directly on the other layer or substrate, or intervening layers may also be present. Further, it will be understood that when a layer is referred to as being "under" another layer, it may be directly under, and one or more intervening layers may also be present. In addition, it will also be understood that when a layer is referred to as being "between" two layers, it may be the only layer between the two layers, or one or more intervening layers may also be present. Like reference numerals refer to like elements throughout.

Figure 2:
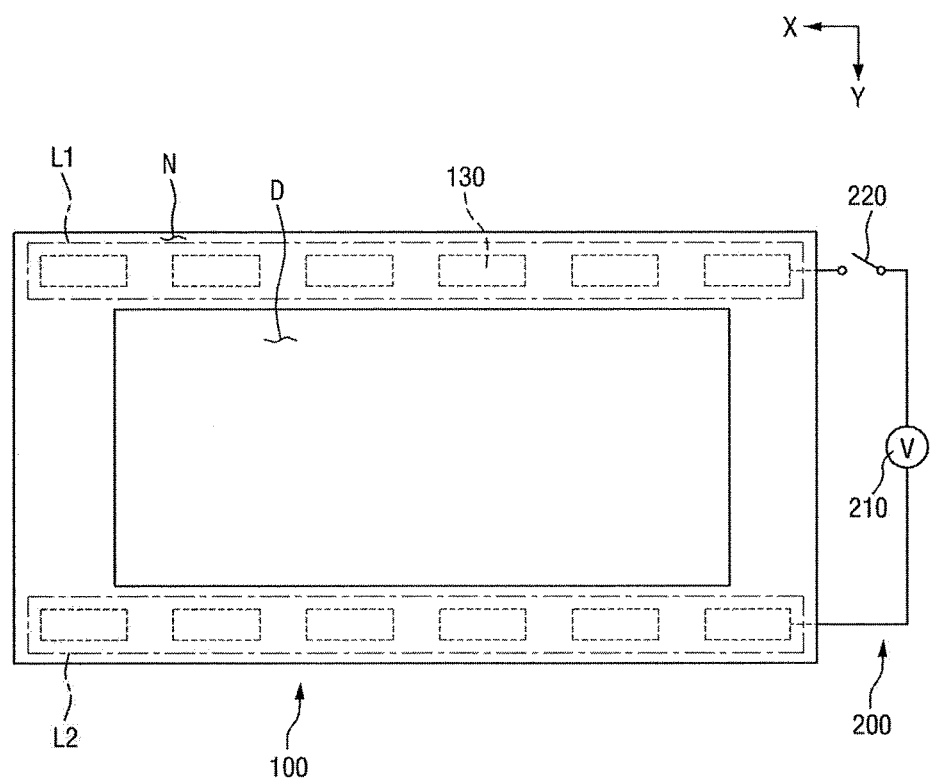
FIG. 2 illustrates a bottom view of the flexible display.
Figure 3:
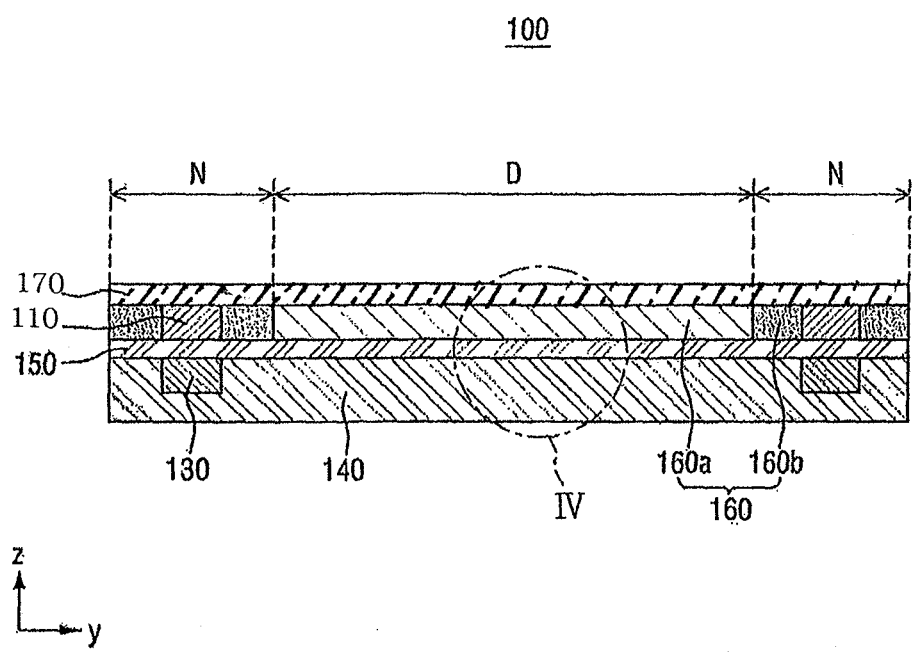
FIG. 3 illustrates a view taken along line section III-III' of FIG. 1.
Figure 4:
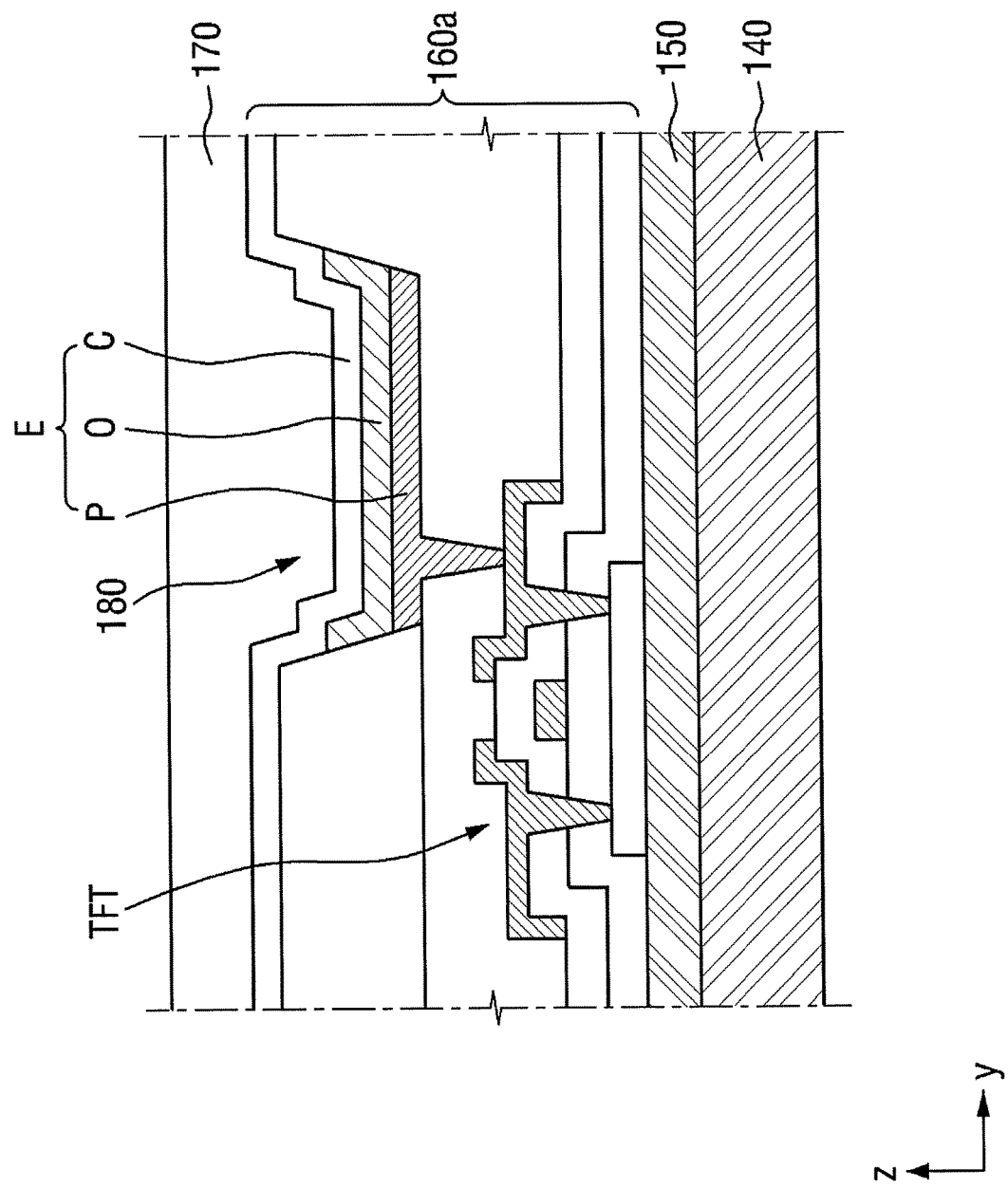
FIG. 4 illustrates an enlarged cross-sectional view of portion IV of FIG. 3.
Figure 5:
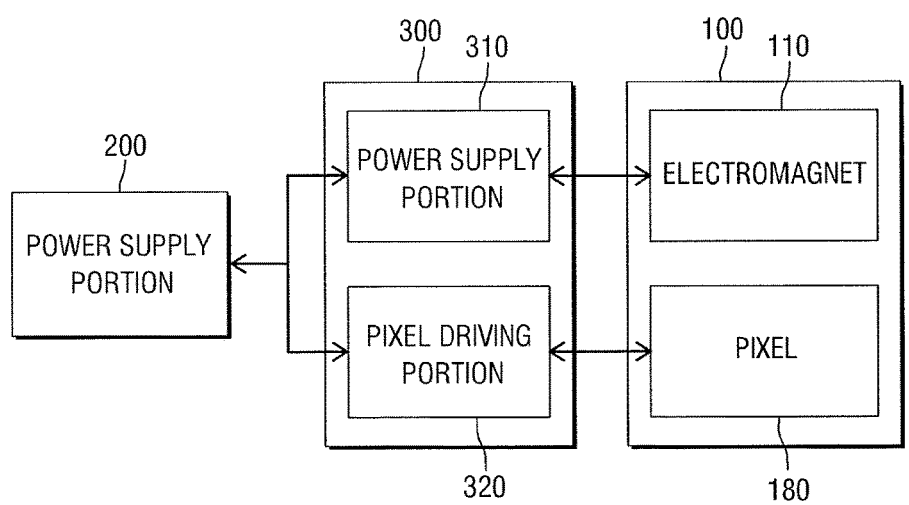
FIG. 5 illustrates one possible configuration of the flexible display.

FIG. 1 illustrates an embodiment of a flexible display, FIG. 2 is a bottom view of the flexible display, FIG. 3 is a view taken along section line III-III' of FIG. 1, FIG. 4 is an enlarged cross-sectional view of portion IV of FIG. 3, and FIG. 5 illustrates a configuration of the flexible display according to one embodiment.

Referring to FIGS. 1 to 5, flexible display 100 includes a flexible display panel 100, a power supply portion 200, and a driving portion 300. The flexible display panel 100 may be a display panel which displays images and has a shape which is able to be changed through, for example, rolling, folding, bending, and the like. The display panel may be, for example, an LCD (Liquid Crystal Display) panel, an electrophoretic display panel, an organic light emitting diode (OLED) display panel, an LED (Light Emitting Diode) panel, an inorganic EL (Electro Luminescence) display panel, a FED (Field Emission Display) panel, a SED (Surface-conduction Electron-emitter Display) panel, a PDP (Plasma Display Panel), a CRT (Cathode Ray Tube) display panel, or the like. For illustrative purposes, an OLED display panel having a shape which is able to be changed will be described.

Referring to FIGS. 1 to 3, the flexible display panel 100 may be divided into a display area D and a non-display area N. The display area D may correspond to an area where an image is displayed, and may be positioned in a predetermined (e.g., center) portion of the flexible display panel 100. In other embodiments, the predetermined position may be different from the center. The non-display area N may correspond to an area where an image is not displayed. For example, the non-display area N may be an edge portion of the flexible display panel 100. In one embodiment, the non-display area N may be adjacent to and surround the display area D. However, in other embodiments one or more intervening areas may be situated between areas D and N, and/or area N may not completely surround area D.

In one embodiment, the shape formed by a boundary line between the display area D and the non-display area N may be a rectangle. In other embodiments, the boundary line may be a different shape including but not limited to a circle or polygon.

As illustrated in FIG. 3, the flexible display panel 100 may include a flexible substrate 140, a barrier layer 150, a device layer 160, and an encapsulation layer 170. The flexible substrate 140 is a substrate having a shape which is able to be changed, such as rolling, folding, and bending. In one example, the substrate may be provided as a cuboidal plate. Also, the flexible substrate 140 may be made of plastic having superior heat resistance and durability such as, for example, one or more of polyethylene ether phthalate, polyethylene naphthalate, polycarbonate, polyarylate, polyether imide, polyether sulfone, or polyimide.

The barrier layer 150 may be positioned on the flexible substrate 140, and may be made of an insulating material. Further, the barrier layer 150 may include at least one inorganic film, at least one organic film, at least one organic/inorganic film, and/or a laminated film including a combination of the aforementioned films. The barrier layer 150 may prevent unnecessary components from penetrating the flexible substrate 140 and permeating into the device layer 160.

The device layer 160 may be positioned on the barrier layer 150, and may include a first device layer 160a and a second device layer 160b. The first device layer 160a may be positioned in at a predetermined (e.g., center) portion of the flexible substrate 140. Further, the first device layer 160a may be positioned in the display area D. The first device layer 160a may include pixels 180 for displaying an image. Each pixel 180 may include an organic light emitting device E (see FIG. 4). Further, the first device layer 160a may further include various devices such as one or more thin film transistors for driving the pixel 180 and at least one capacitor.

The second device layer 160b may be positioned at a predetermined (e.g., edge) portion of the flexible substrate 140. Further, the second device layer 160b may be positioned in the non-display area N. The second device layer 160b may not include the pixel 180. Further, the second device layer 160b may include various kinds of circuits and wirings for supplying image or other signals to the pixels 180 included in the first device layer 160a.

The encapsulation layer 170 may be positioned on the device layer 160, and may be made of an insulating material. Further, the encapsulation layer 170 may include at least one inorganic film, at least one organic layer, at least one organic/inorganic film, and/or a laminated film including a combination of the aforementioned films. The encapsulation layer 170 may function to protect the device layer 160 from an external environment by covering the device layer 160.

Referring to FIG. 4, the first device layer 160a may include at least one organic light emitting device E. The organic light emitting device E may include a pixel electrode P, a common electrode C that faces the pixel electrode P, and an organic light emitting layer O interposed between the pixel electrode P and the common electrode C. The pixel electrode P may be electrically connected to a driving thin film transistor (TFT) on the flexible substrate 140. Further, the organic light emitting device E may include at least one switching thin film transistor and a storage capacitor.

When current is applied to the organic light emitting layer O through the pixel electrode P and the common electrode C, the organic light emitting device E emits light. The light emitted from the organic light emitting layer O may be emitted only to the side of the flexible substrate 140, only to the side of the encapsulation layer 170, or to both sides of the flexible substrate 140 and the encapsulation layer 170.

Referring again to FIGS. 1 to 3, the flexible display panel 100 may further include an electromagnet 110, a connection wiring 120, and a metal plate 130. The electromagnet 110 is magnetized when current is received and demagnetized to return to an original state when current is cut off. The electromagnet 110 may include, for example, a cylindrical core and a coil. The coil is made of a predetermined metal material, and may be spirally wound on the core with a predetermined number of turns. When current is applied to the wound coil, ends of electromagnet 110 become a north (N) magnetic pole and a south (S) magnetic pole, respectively. The magnetic poles may be determined by the winding direction of the coil and the direction of the current applied to the coil.

The electromagnet 110 may be positioned on the edge portion of the flexible substrate 140. Further, the electromagnet 110 may be positioned in the non-display area N. Further, the electromagnet 110 may be included in the second device layer 160b. In one embodiment, the electromagnet 110 is surrounded by the second device layer 160b.

In the example illustrated in FIG. 3, an upper surface of the electromagnet 110 may contact the encapsulation layer 170, a lower surface of the electromagnet 110 may contact the barrier layer 150, and a side surface of the electromagnet 110 may contact the second device layer 160b. The portions that contact the electromagnet 110 (that is, the encapsulation layer 170, the barrier layer 150, and the second device layer 160b) may be made of an insulating material. Also, the core and the coil of the electromagnet 110 may be appropriately arranged so that the portion of the electromagnet 110, which has a specific polarity corresponds to the upper surface of the electromagnet 110 or the lower surface of the electromagnet 110.

In one embodiment, the electromagnet 110 may be spaced apart from the first device layer 160a by a sufficient distance. That is, in order to minimize influence of magnetic force exerted by the electromagnet 110 on the pixels 180 positioned inside the first device layer 160a, the electromagnet 110 may be spaced apart from the first device layer 160a by a sufficient distance. The second device layer 160b that includes an insulating material may be interposed between the electromagnet 110 and the first device layer 160a.

In the exemplary embodiment of FIG. 3, the electromagnet 110 is positioned in the center portion of the non-display area N. In other embodiments, the electromagnet 110 may be positioned at an edge of the non-display area N that is not adjacent to the display area D. For example, the electromagnet 110 may contact edges of the barrier layer 150 and the encapsulation layer 170, and one side surface of the electromagnet 110 may face outside. Further, a material that may intercept the magnetic force may be interposed between the electromagnet 110 and the first device layer 160a, in addition to the second device layer 160b. Further, a metal material may be bonded to the side surface of the electromagnet 110 that does not face the first device layer 160a. If the electromagnet 110 and the metal material are bonded together, a magnetic circuit that includes the electromagnet 110 and the metal material may be formed. In such a magnetic circuit, most magnetic force passes through the inside of the metal material. Thus, the influence of magnetic force exerted on the first device layer 160a may be reduced or minimized.

In one embodiment, a plurality of electromagnets 110 may be provided. The plurality of electromagnets 110 may be positioned on one side of the non-display area N and on another (e.g., opposing) side of the non-display area N. In one embodiment, the plurality of electromagnets 110 may be arranged in a parallel structure. In the exemplary embodiment of FIG. 1, some of the electromagnets 110 are positioned in the non-display area N adjacent to one side of the flexible display panel 100, and other electromagnets 110 are positioned in the opposing side of the non-display area N.

Also, in the exemplary embodiment of FIG. 1, the plurality of electromagnets 110 are positioned adjacent the long sides of the flexible display panel 100. In other embodiments, the plurality of electromagnets 110 may be positioned adjacent the short sides of the flexible display panel 100.

The electromagnets 110 positioned on upper side of the display panel may be arranged in a first line L1 and spaced apart from each other. The electromagnets 110 positioned on the lower side of the display panel may be arranged in a second line L2 and may also be spaced apart from each other. In the exemplary embodiment of FIG. 1, the first line L1 and the second line L2 may be lines that extend in the x-direction. In other embodiments, the first and second lines L1 and L2 may extend in the y-direction.

Also, the first line L1 and the second line L2 may be parallel to each other, but not necessarily so. In another example, the first line L1 may be parallel to a boundary line between the display area D that is adjacent to one side of the non-display area N and the non-display area N. Similarly, the second line L2 may be parallel to a boundary line between the display area D that is adjacent to the opposing side of the non-display area N and the non-display area N. Also, in the exemplary embodiment of FIG. 1, adjacent pairs of electromagnets 110 may be spaced by the same or different distances.

The electromagnets 110 may be symmetrically arranged based on or relative to the display area D. In an exemplary embodiment, electromagnets 110 may be arranged to be symmetrical relative to a line that divides the display area D into two equal parts. In other embodiment, the electromagnets 110 may be arranged to be symmetrical relative to a predetermined point, which, for example, may be a center portion or point of the display area D. Also, the number of electromagnets on opposing sides of the display area D may be the same or different.

Connection wiring 120 may electrically connect the electromagnets 110 to each other, and optionally may connect the electromagnets 110 to the power supply portion 200. The connection wiring 120 may be made of a conductive material through which current may flow. Also, in one embodiment, the connection wiring 120 may wrap around the cores of the electromagnets 110 to serve as the coils of the electromagnets 110. In other embodiments, the coil windings may be separate from and coupled to the connection wiring 120.

The metal plate 130 may be made of or include, for example, iron (Fe), aluminum (Al), or another metal, or a combination of metals. The metal plate 130 may be positioned on the edge portion of the flexible substrate 140. Further, the metal plate 130 may be positioned in the non-display area N. Further, the metal plate 130 may be included in the flexible substrate 140, e.g., the metal plate 130 may be surrounded by one or more sides (or all sides) by the flexible substrate 140.

In the exemplary embodiment of FIG. 3, the upper surface of the metal plate 130 may contact the barrier layer 150, and the lower and side surfaces of the metal plate 130 may contact the flexible substrate 140. That is, the metal plate 130 may not project from the flexible substrate 140, but may be inserted into a groove portion provided on the flexible substrate 140. The portions that contact the metal plate 130 (that is, the barrier layer 150 and the flexible substrate 140) may be made of an insulating material.

In one embodiment, a plurality of metal plates 130 may be provided. The plurality of metal plates 130 may be positioned on opposing sides of the non-display area N. Also, the metal plates 130 may be arranged to be parallel to one another on the opposing sides. In the exemplary embodiment of FIG. 2, some metal plates 130 may be positioned in the non-display area N adjacent to one side of the flexible display panel 100, and other metal plates 130 may be positioned in the non-display area N adjacent to the opposing side of the flexible display panel 100. FIG. 2 illustrates that the plurality of metal plates 130 are positioned in the non-display area N adjacent to the long sides of the flexible display panel 100. In other embodiments, the metal plates 130 may be positioned in the non-display area N adjacent to the short sides of the flexible display panel 100.

The metal plates 130 positioned on one side of the non-display area N may be arranged in a first line L1 and may be spaced apart from each other. Similarly, the metal plates 130 positioned on the opposing side of the non-display area N may be arranged in a second line L2 and may be spaced apart from each other. The first line L1 and the second line L2 may be parallel to each other, but not necessarily so. In the exemplary embodiment of FIG. 2, the metal plates 130 may be spaced apart from each by the same or different distances.

The metal plates 130 may be symmetrically arranged based on or relative to the display area D. In an exemplary embodiment, the metal plates 130 may be arranged to be symmetrical relative to a line that divides the display area D into two equal parts. In another exemplary embodiment, the plurality of metal plates 130 may be arranged to be symmetrical relative to a predetermined point or portion (e.g., center) of the display area D. Also, in alternative embodiments, the electromagnets and/or the metal plates may be arranged asymmetrically relative to display area D.

The metal plates 130 may be positioned on a different plane from the electromagnets 110. In the exemplary embodiment of FIG. 3, the electromagnet 110 is positioned on a same plane as that of the device layer 160, and the metal plate 130 is positioned on a same plane as the flexible substrate 140. That is, the electromagnets 110 may be arranged adjacent to one surface of the flexible display panel 100, and the metal plates 130 may be arranged within or adjacent to an opposing surface of the flexible display panel 100.

The metal plates 130 and electromagnets 110 may overlap each other. In the exemplary embodiment of FIGS. 1 and 2, the metal plates 130 and electromagnets 110 overlap each other. In other embodiments, the metal plates and electromagnets may not completely overlap. Because the barrier layer 150 is made of an insulating material interposed between the metal plate 130 and electromagnet 110, the influence of magnetic force exerted by the electromagnet 110 on the metal plate 130 may be reduced.

Unlike the electromagnets 110, the metal plates 130 may not be connected by connection wiring 120. In an exemplary embodiment, the metal plates 130 may be surrounded by an insulating material. More specifically, flexible substrate 140 made of an insulating material may be positioned between the plurality of metal plates 130.

The power supply portion 200 may be electrically connected to flexible display panel 100 and driving portion 300. The power supply portion 200 may supply current to various devices in or coupled to flexible display panel 100 and driving portion 300. Examples of the various devices include the electromagnets 110 and pixels 180 in the flexible display panel 100, and an electromagnet driving portion 310 and a pixel driving portion 320 in the driving portion 300. In the exemplary embodiment of FIGS. 1 and 2, the power supply portion 200 may be separated from the flexible display panel 100, but this is not necessary. For example, the power supply portion 200 may be integrally formed with the flexible display panel 100.

The power supply portion 200 may include a power portion 210 and a switch 220. The power portion 210 is a source that may supply the power. The switch 220 may be positioned adjacent to the power portion 210, and may be turned on/off to apply the power that is supplied from the power portion 210 to the flexible display panel and/or the driving portion 300 or may intercept (or cut off) the power supply.

The powers supply portion 200 may be electrically connected to the electromagnet 110 by connection wiring 120. In the exemplary embodiment of FIG. 1, the power supply portion 200 may be electrically connected to the electromagnet 110 that is arranged at one end of the first line L1 and the electromagnet 110 that is arranged in opposing relation to one end of the second line L2. In another exemplary embodiment, the power supply portion 200 may be individually connected to the electromagnets 110 or to groups of electromagnets.

The power supply portion 200 cause the electromagnets 110 to be magnetized, by making current flow to the electromagnets 110 through control of the switch 220. When current flow to the electromagnets 110 is cut off, the electromagnets become demagnetized. In the exemplary embodiment of FIG. 1, only one switch 220 may be provided between the power portion 210 and electromagnets 110 to magnetize or demagnetize the electromagnets 110 as a whole, depending on whether the switch 220 is turned on/off.

In other embodiments, the electromagnets 110 may be magnetized or demagnetized individually or in groups. For example, respective electromagnets 110 may be individually connected to the power portion 210, and switches 220 may be installed between the power portion 210 and respective electromagnets 110 to individually magnetize/demagnetize the electromagnets 110. Accordingly, only desired electromagnets 110 may be magnetized, and thus the power consumption may be reduced.

A variable resistor may optionally be positioned between the power supply portion 200 and electromagnets 110. The variable resistor is a resistor having a resistance value which may be changed. By changing the resistance value of the variable resistor, the level of current supplied to the electromagnets 110 may be adjusted. In the exemplary embodiment of FIG. 1, one variable resistor may be installed between the power supply portion 200 and the plurality of electromagnets 110, to adjust the level of current supplied to the electromagnets 110 as a whole. In other embodiments, variable resistors that correspond to the electromagnets 110 may be installed to individually adjust the level of current supplied to the electromagnets 110 or to groups of the electromagnets. The magnetic force of the electromagnets 110 may be changed according to the level of current that is supplied to the electromagnets 110. By adjusting the resistance value of the variable resistor, the magnetic force of the electromagnets 110 may be changed.

The driving portion 300 may be connected to the flexible display panel 100 and the power supply portion 200. The driving portion 300 may be positioned to be spaced apart from the flexible display panel 100, and may be attached to the flexible display panel 100. The driving portion 300 may apply various control signals to the flexible display panel 100 and the power supply portion 200. In an exemplary embodiment, if a user generates a control signal through a separate input device for desired control, the driving portion 300 may perform work that corresponds to the control signal.

The driving portion 300 may include an electromagnet driving portion 310 and a pixel driving portion 320. The electromagnet driving portion 310 may adjust the amount of current applied to the electromagnet 110 by applying the control signal to the flexible display panel 100 and the power supply portion 200. In an exemplary embodiment, the electromagnet driving portion 310 may permit or intercept (e.g., cut off) the current to the electromagnet 110 through control of switch 220. In another exemplary embodiment, the electromagnet driving portion 310 may adjust the level of current supplied to the electromagnet 110 through adjustment of the resistance value of the variable resistor.

The pixel driving portion 320 may adjust luminance of light emitted from the pixel 180 through application of the control signal to the flexible display panel 100 and the power supply portion 200.

The flexible display may further include an accommodation member that accommodates therein the flexible display panel 100, the power supply portion 200, and the driving portion 300. The accommodation member may protect the flexible display panel 100, the power supply portion 200, and the driving portion 300 from the external environment. The accommodation member may be made of a material having flexibility, and in one embodiment the degree of flexibility may be similar to flexible substrate 140.

Further, the flexible display may further include a touch panel positioned on the flexible display panel 100. The touch panel is a panel which, for example, may generate various control signals through direct pressing of an image that is displayed on the display area D. The touch panel may, for example, be a touch-type panel such as a capacitance type or a resistance-type panel.

Figure 6:
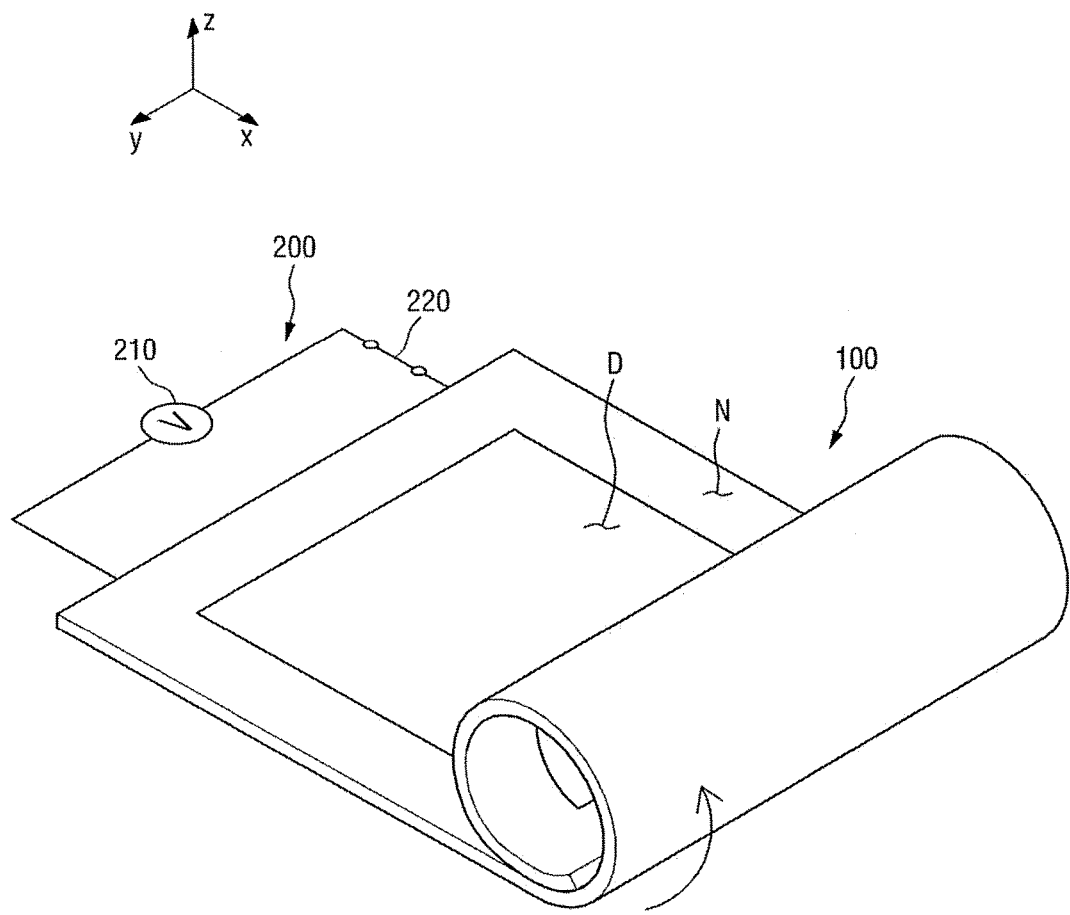
FIG. 6 illustrates the flexible display during a rolling state.
Figure 7:
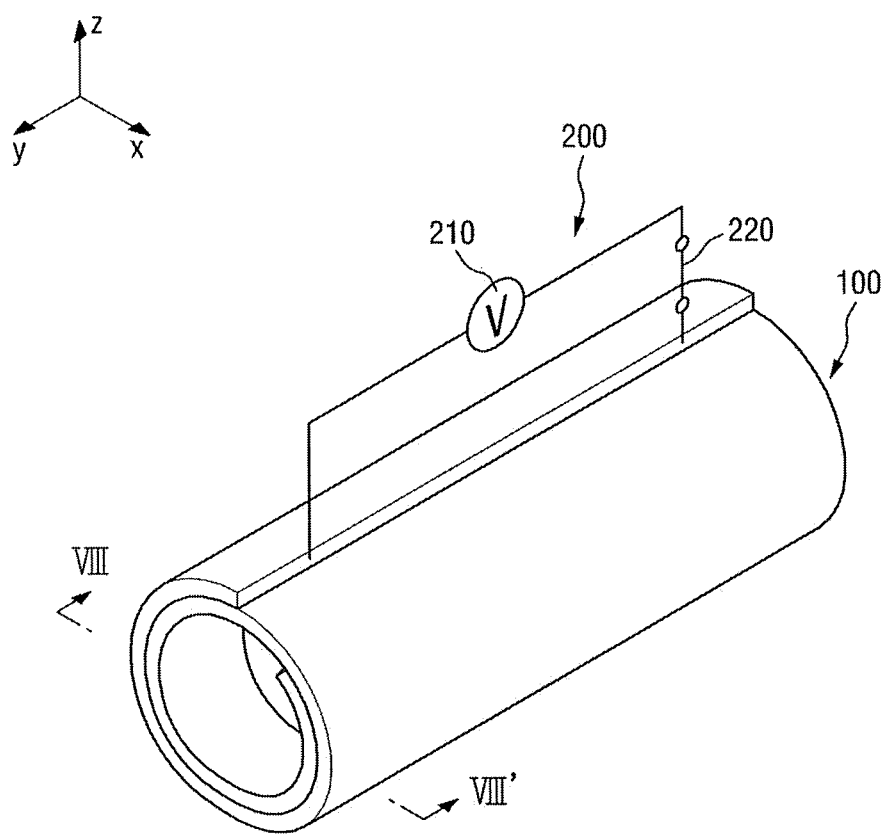
FIG. 7 illustrates the flexible display in a rolled state.
Figure 8:
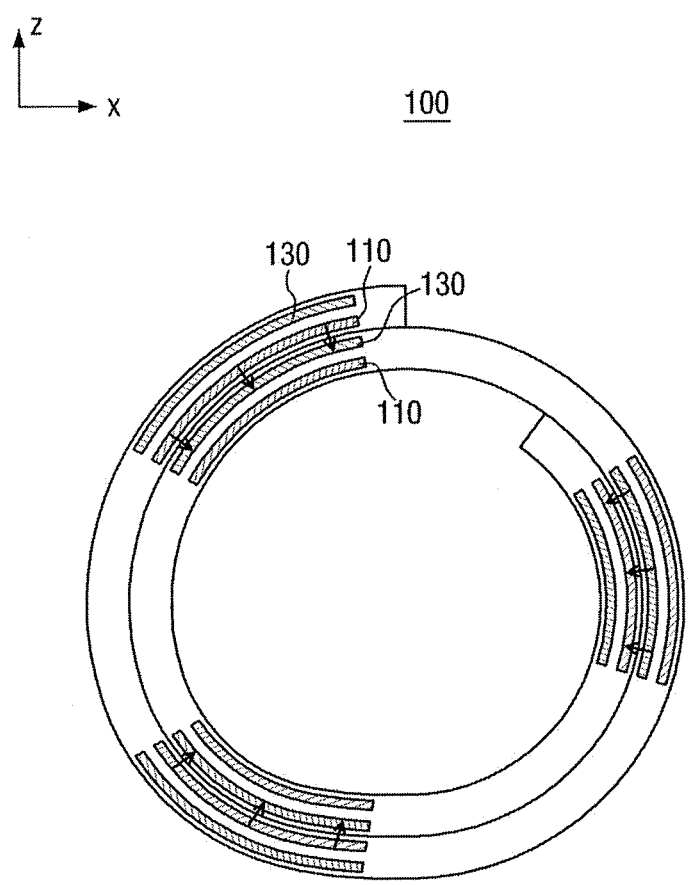
FIG. 8 illustrates a view taken along section line VIII-VIII' of FIG. 7.
Figure 9:
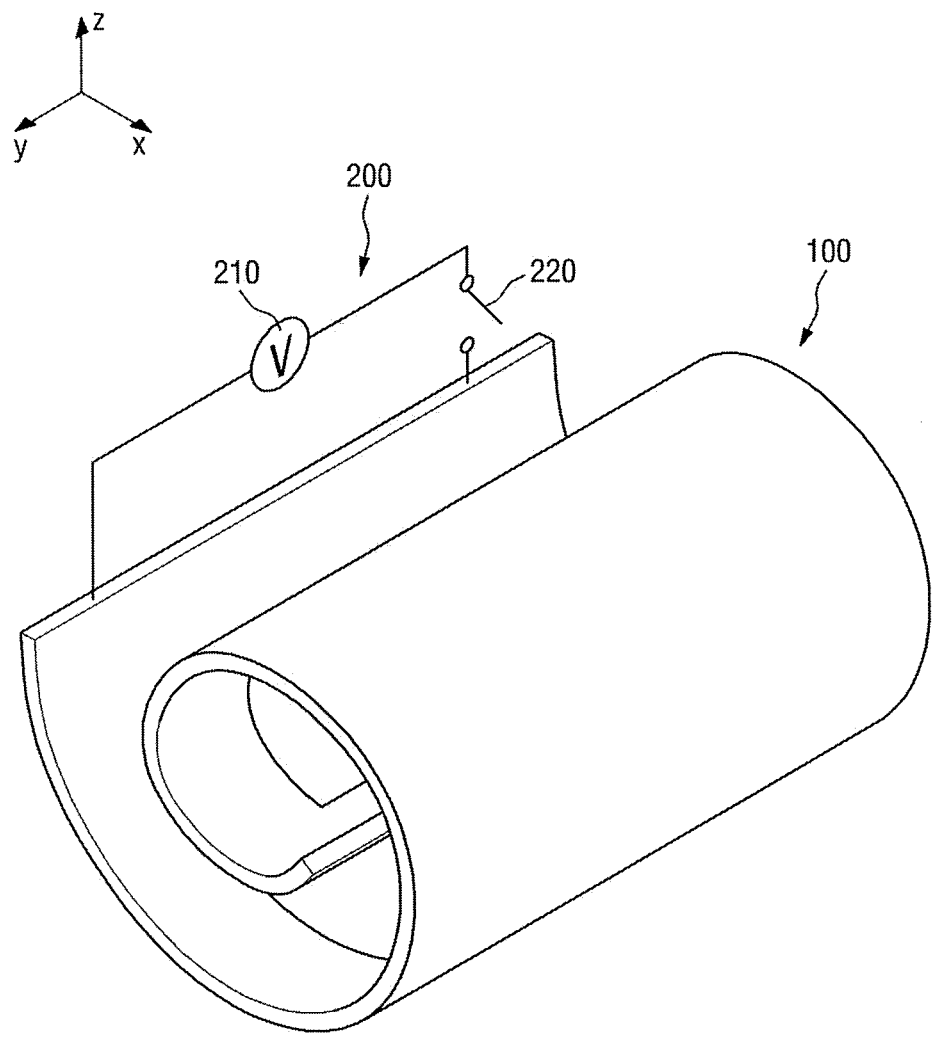
FIG. 9 illustrates an example of the flexible display when power is cut off.
Figure 10:
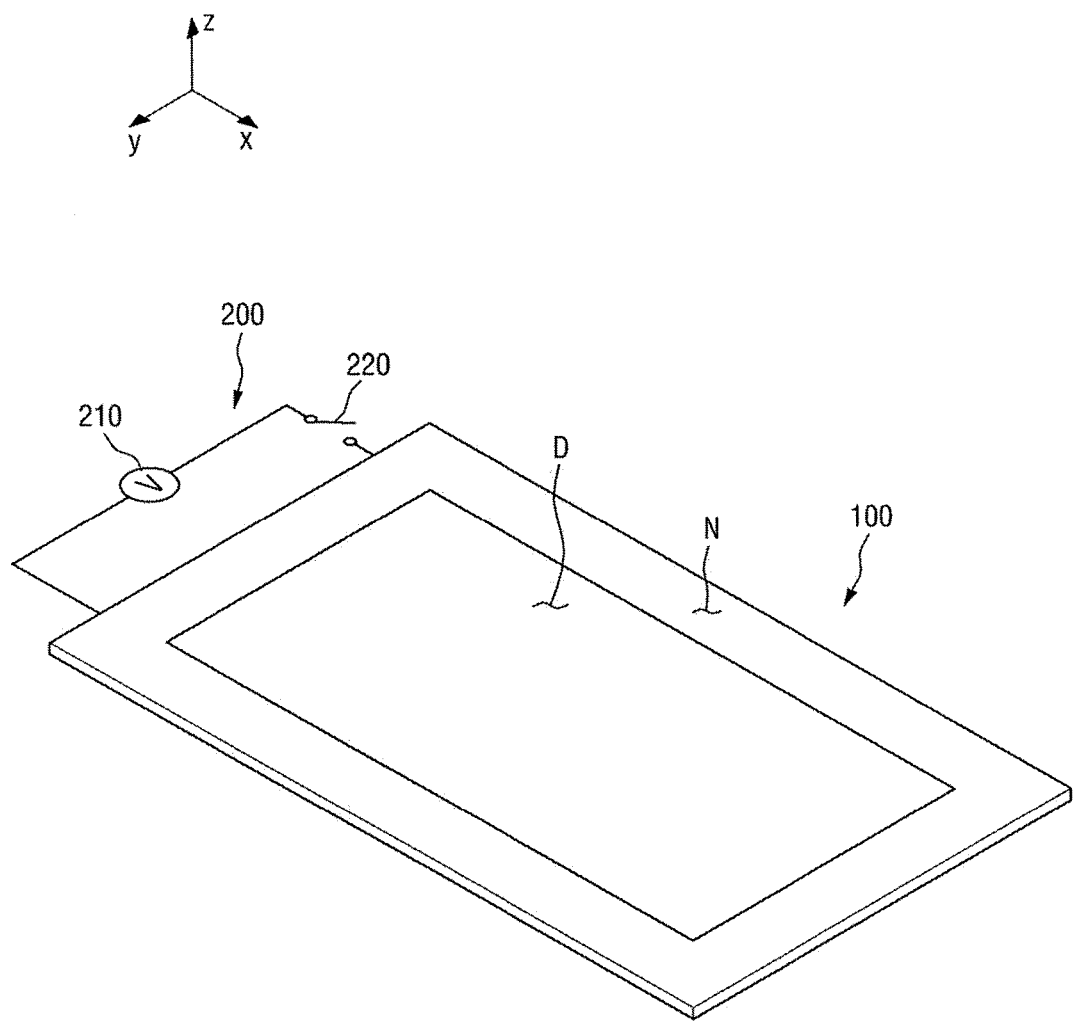
FIG. 10 illustrates an example of the display after power is cut off for a time.

FIG. 6 illustrates a state of flexible display panel 100 during rolling when power is supplied to one or more electromagnets 110 of the flexible display of FIG. 1. FIG. 7 illustrates a state of flexible display panel 100 when rolling is completed and power is supplied to one or more electromagnets 110 of the flexible display of FIG. 1. FIG. 8 is a cross-sectional view taken along line VIII-VIII' of FIG. 7. FIG. 9 is a perspective view illustrating a state of the flexible display panel of FIG. 7 when power supply to the electromagnet 110 is intercepted (or cut off). FIG. 10 is a perspective view illustrating a state of the flexible display panel of FIG. 7 when a predetermined time elapses after power supply to the electromagnet 110 is intercepted (cut off).

Referring to FIG. 6, in order to place the flexible display in a desired form, the shape of the flexible display panel 100 may be changed. FIG. 6 illustrates the exemplary case where the flexible display panel 100 is rolled. When the shape of the flexible display panel 100 is changed by rolling, the electromagnets 110 begin to be positioned adjacent to corresponding ones of the metal plates 130, e.g., metal plates 130 may begin to face corresponding ones of the electromagnets 110 when the flexible display panel 100 is changed to a desired shape. When the shape of the flexible display panel 100 is changed, the shapes of other members adjacent to the flexible display panel 100 (for example, the accommodation member that accommodates the flexible display panel 100 and the like) may also be changed.

If the switch 220 is turned on after the shape of the flexible display panel 100 is changed, power is supplied to all or a portion of the electromagnets 110. Further, the shape of the flexible display panel 100 may be changed in a state where the switch 220 is turned on, that is, in a state where power is supplied to the electromagnets 110. When power is supplied to the electromagnets 110, the electromagnets 110 may generate magnetic forces that pull corresponding ones of the metal plates 130 to fix the flexible display panel 100.

Referring to FIGS. 7 and 8, the flexible display may be fixed (or held) in a desired shape, for example, in a rolled state. That is, the electromagnets 110, which generate magnetic forces when power is applied, may pull corresponding ones of the metal plates 130 to fix the flexible display panel 100. In one embodiment, fixing may cause other members, adjacent to the flexible display panel 100 (for example, the accommodation member and the like, which accommodates the flexible display panel 100) to be fixed together along with the flexible display panel 100. In the exemplary embodiment of FIG. 8, three electromagnets 110 are provided to pull three metal plates 130, respectively, to fix the flexible display panel 100 to the desired shape. In other embodiments, a different number of electromagnets and metal plates may be used. For example, at least one electromagnet 110 may be provided to pull at least one metal plate 130 to fix the flexible display panel 100 in a desired shape.

Referring to FIG. 9, when the power supply to the electromagnets 110 is cut off in a state where the flexible display panel 100 is rolled, the electromagnets 110 may not function as magnets any more. That is, the electromagnets 110 are unable to generate magnetic forces any further, and thus the forces between electromagnets 110 and respective ones of the metal plates 130 are eliminated. Accordingly, the electromagnets 110 and corresponding ones of the metal plates 130 may be instantaneously separated from each other due to elasticity of the flexible display panel 100. The elasticity of the flexible display panel 100 may be, for example, a restoring force of the flexible display panel 100 to return to the original shape thereof.

Referring to FIG. 10, when a predetermined time elapses after the power supply to the electromagnets 110 is cut off, the flexible display panel 100 may be partially or fully restored to its original shape due to the elasticity of the flexible display panel 100.

According to the flexible display and the method for fixing the flexible display, the flexible display may be easily fixed in the desired shape by the electromagnet 110 included in the flexible display panel 100. That is, by magnetizing the electromagnet 110 through application of power to the electromagnet 110, the flexible display may be easily fixed in the desired shape, and by simply turning off or reducing the power supply to the electromagnet 110, the flexible display may be returned to its original shape.

One or more of the aforementioned embodiments may also alleviate the need for a separate fixing member (e.g., clip or bolt in the accommodation member surrounding flexible display panel) to fix the panel in the desired state or shape. Accordingly, a troublesome assembling process (such as fastening of the clip or bolt) is not required, and thus the flexible display may be simply fixed in the desired shape. Further, since the flexible display panel 100 includes one or more electromagnets 110, the size, weight, and cost of manufacturing the flexible display may be reduced. Also, manufacturing time may be reduced because there is no need to install a separate fixing member.

Figure 11:
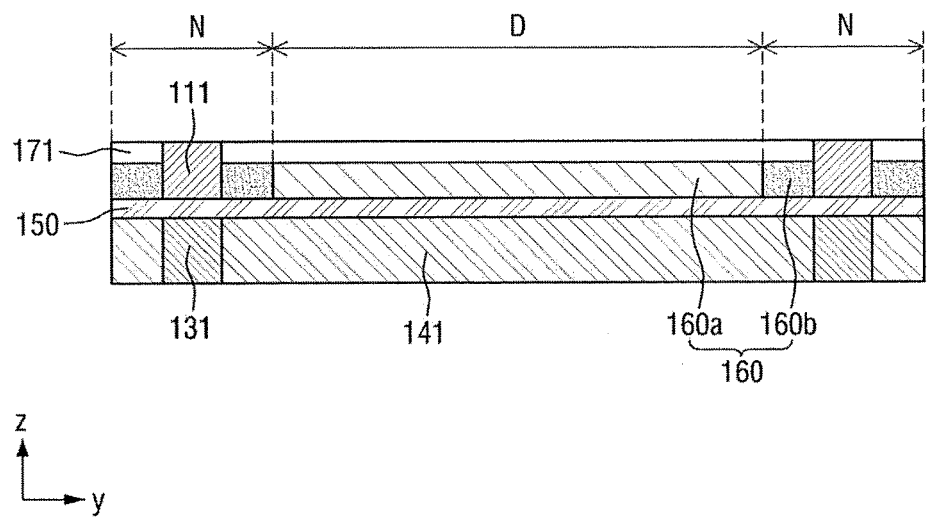
FIG. 11 illustrates another embodiment of a flexible display.

FIG. 11 illustrates a cross-sectional view of another embodiment of a flexible display 101. Referring to FIG. 11, at least one of an electromagnet 111 or a metal plate 131 exposed to an external surface of flexible display panel 101. In one embodiment, at least one of the electromagnet 111 or the metal plate 131 may be visually seen along an external surface of the display. In an exemplary embodiment, an upper end portion of the electromagnet 111 may be surrounded by an encapsulation layer 171. That is, the edge portion of the encapsulation layer 171 may be partially patterned to expose the electromagnet 111. Further, the metal plate 131 may be inserted to penetrate the edge portion of a flexible substrate 141. That is, the edge portion of the flexible substrate 141 may include at least one hole into which the metal plate 131 may be inserted.

According to this embodiment, at least one of the electromagnet 111 or the metal plate 131 is exposed to the outside of the flexible display panel 101. Thus, when the flexible display is changed to a desired shape, the bonding force between the electromagnet 111 and the corresponding metal plate 131 may be increased.

Figure 12:
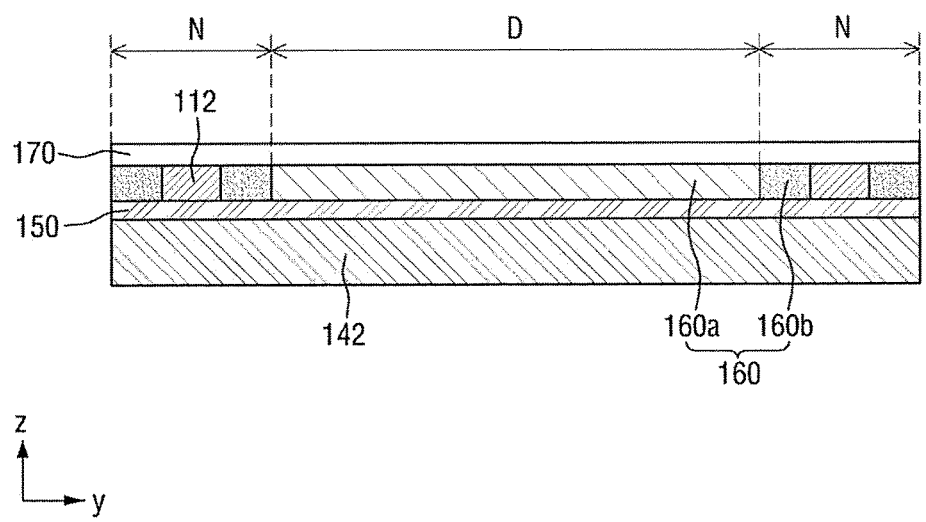
FIG. 12 illustrates another embodiment of a flexible display.

FIG. 12 illustrates a cross-sectional view of another embodiment of a flexible display 102. Referring to FIG. 12, in this embodiment, the metal plate 131 is omitted from the flexible display panel 102. That is, the flexible display may be fixed in the desired shape only by the electromagnet 112.

More specifically, in the case where power is applied to electromagnet 112, two or more electromagnets 112 may be made to pull each other, for example, by appropriately adjusting the position of the polarities generated by the electromagnets 112. That is, by appropriately adjusting the application direction of current or turning direction of the coils of the electromagnets, the positions of the electromagnets 112 may be adjusted so that the north (N) magnetic pole of one electromagnet is attracted to the south (S) magnetic pole of another electromagnet to fixed the desired shape.

Additionally, or alternatively, the flexible substrate 142 may include a metal material. This metal material may be pulled by the electromagnets 112 that generate magnetic force. In an exemplary embodiment, flexible substrate 142 may be made of metal foil and thus may have metallic properties. Such a foil may be pulled by one or more electromagnets 112 that generate magnetic force to fix the display in a desired shape. Thus, in this embodiment, the flexible substrate 142 may effectively serve as metal plate 130.

In these embodiments, metal plates 130 are omitted and, thus, manufacturing cost of the flexible display, and processing costs and manufacturing time for not having to provide multiple metal plate 130, may be reduced. Further, the weight of the flexible display may also be reduced. Further, since it is not required to process the flexible substrate 142 in order to arrange the metal plates 130, the manufacturing cost and time of the flexible substrate 142 may be reduced.

Figure 13:
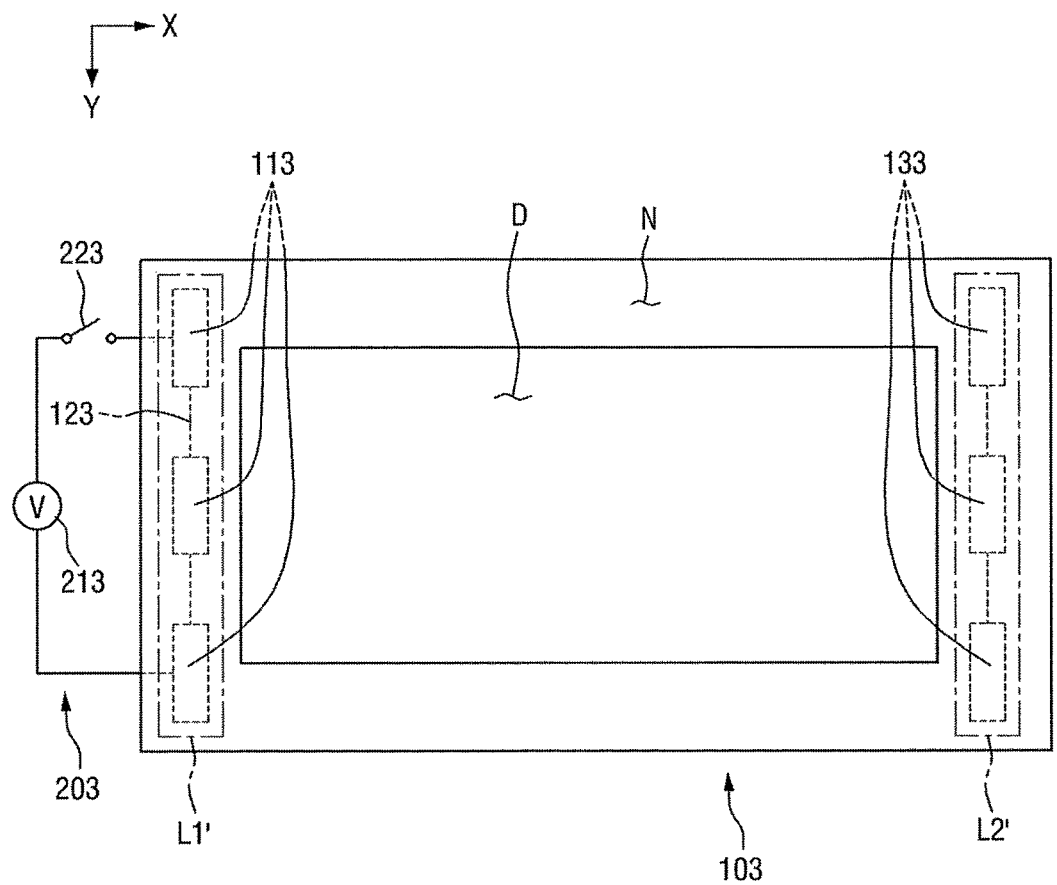
FIG. 13 illustrates another embodiment of a flexible display.

FIG. 13 illustrates another embodiment of a flexible display 103. Referring to FIG. 13, a plurality of electromagnets 113 and a plurality of metal plates 133 may be positioned on a same plane. In an exemplary embodiment, the electromagnets 113 and metal plates 133 may be positioned on the same plane as the second device layer 160b. In another exemplary embodiment, the electromagnets 113 and metal plates 133 may be positioned on the same plane as the flexible substrate 140.

According to this embodiment, electromagnets 113 may be positioned on one side of the non-display area N and metal plates 133 may be positioned on the opposing side of the non-display area N.

Further, a plurality of electromagnets 113 and metal plates 133 may be provided. In an exemplary embodiment illustrated in FIG. 13, the electromagnets 113 may be positioned in the non-display area N adjacent to the one side of the flexible display panel 103, and the metal plates 133 may be positioned in the non-display area N that is adjacent to the opposing side of the flexible display panel 103.

FIG. 13 illustrates that the electromagnets 113 and metal plates 133 are positioned in the non-display areas N adjacent to the short sides of the flexible display panel 103. In other embodiments, the electromagnets 113 and metal plates 133 may be positioned in the non-display areas N adjacent to the long sides of the flexible display panel 103.

The electromagnets 113 positioned on one side of the non-display area N may be arranged in a first line L1' and may be spaced apart from each other. The metal plates 133 positioned on the other side of the non-display area N may be arranged in a second line L2' and may be spaced apart from each other. In the exemplary embodiment of FIG. 13, the first line L1' and the second line L2' may extend in the y-direction. Alternatively, the first and second lines L1' and L2' may extend in the x-direction.

Also, the first line L1' and the second line L2' may be parallel to each other. In another example, the first line L1' may be parallel to a boundary line between the display area D adjacent to one side of the non-display area N and the non-display area N. The second line L2' may be parallel to a boundary line between the display area D adjacent to the other side of the non-display area N and the non-display area N. In the exemplary embodiment of FIG. 13, the spacing distances for the electromagnets 113 and metal plates 133 may be the same or different.

The electromagnets 113 and metal plates 133 may be symmetrically arranged based on or relative to display area D. In an exemplary embodiment, the electromagnets 113 and metal plates 133 may be arranged to be symmetrical relative to a line that divides the display area D into two equal parts. In another exemplary embodiment, the electromagnets 113 and metal plates 133 may be arranged to be symmetrical relative to a predetermined point or position (e.g., center) of the display area D.

The electromagnets 113 may be connected to each other through connection wiring 123. Alternatively, the metal plates 133 may not be connected to each other; that is, the metal plates 133 may be surrounded by insulating materials, respectively.

A power supply portion 203 may include a power portion 213 and a switch 223, and may be electrically connected to electromagnets 113 through the connection wiring 123. Further, the power supply portion 203 may not be electrically connected to the metal plates 133.

Figure 14:
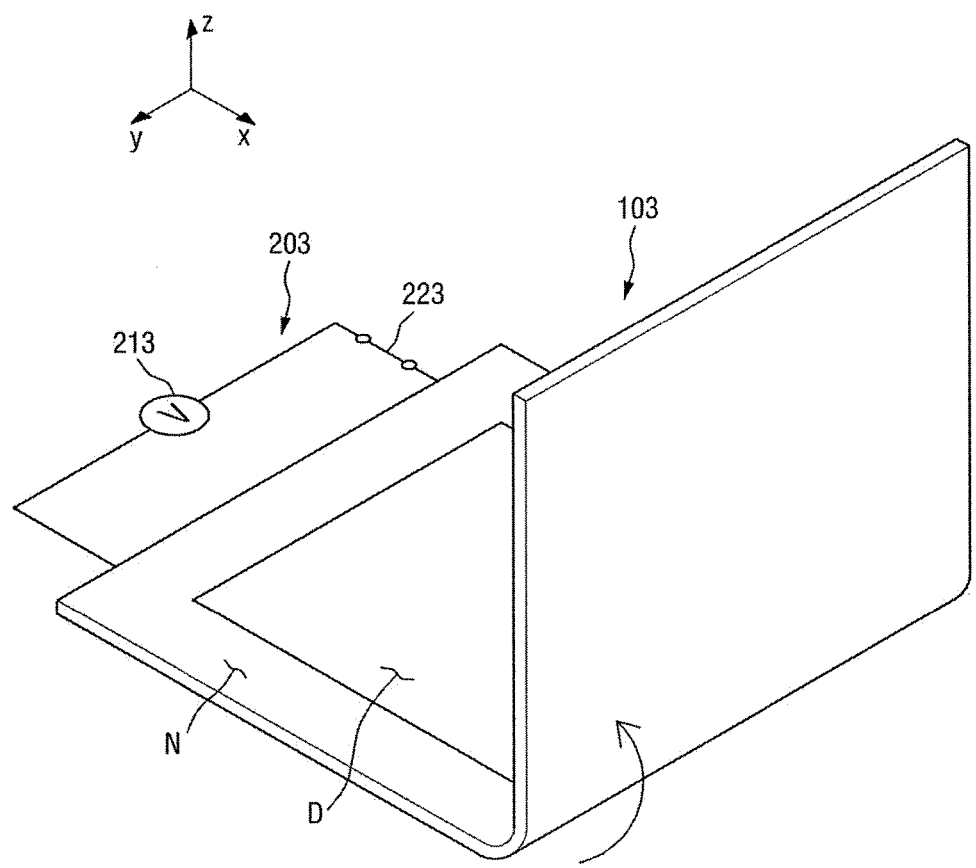
FIG. 14 illustrates the flexible display of FIG. 13 during folding.
Figure 15:
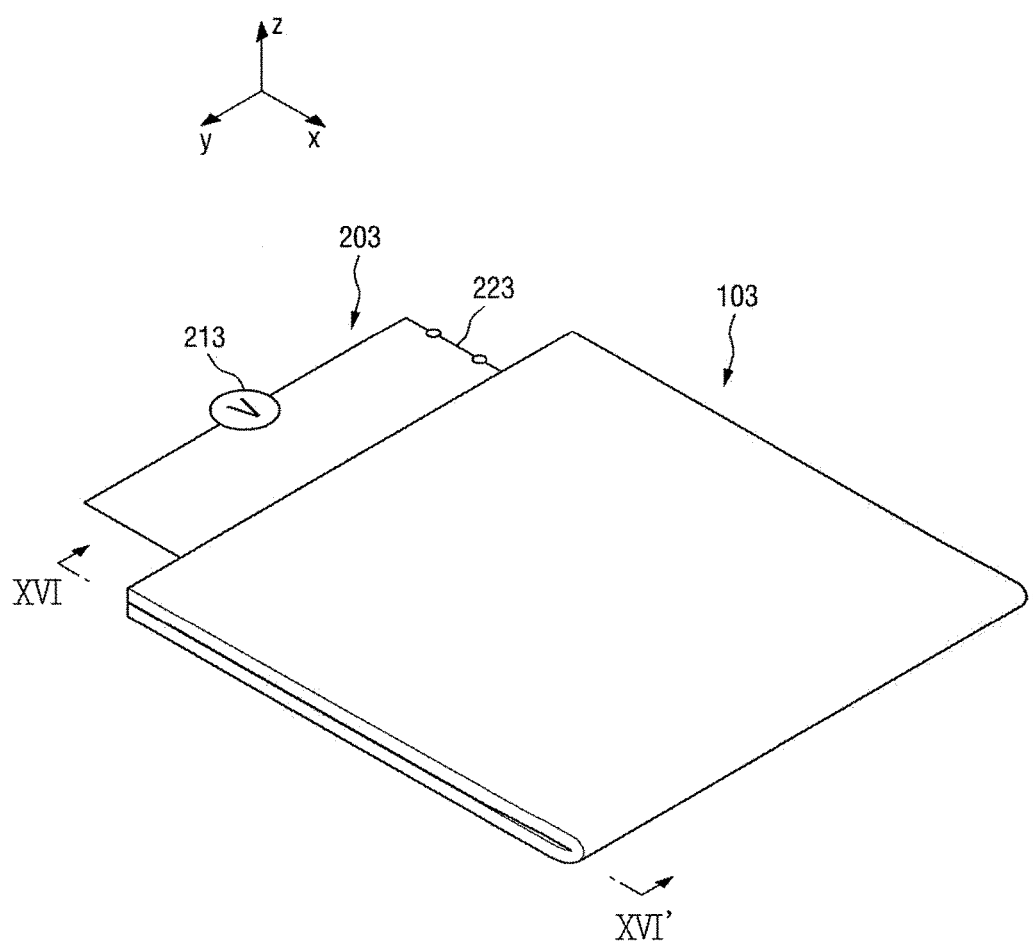
FIG. 15 illustrates the flexible display of FIG. 13 in a folded state.
Figure 16:
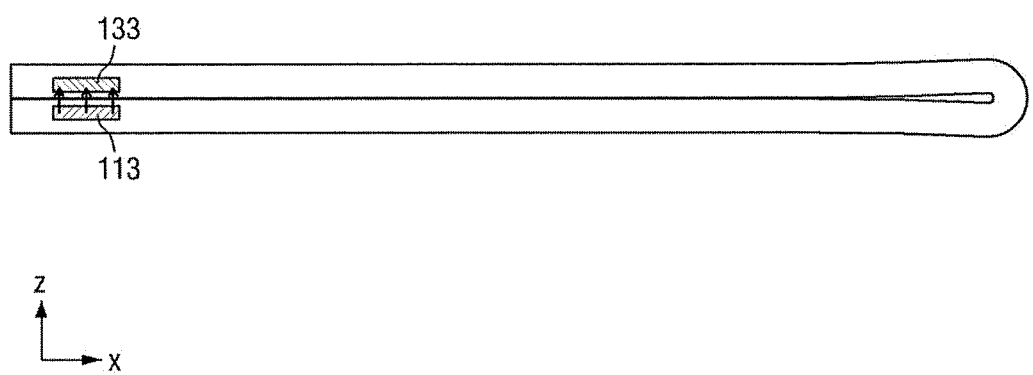
FIG. 16 illustrates a view taken along line section line XVI-XVI' of FIG. 15.

FIG. 14 illustrates flexible display panel 103 in a state of being folded and where power is supplied to an electromagnet 113 of the flexible display of FIG. 13. FIG. 15 illustrates flexible display panel 103 in a completely folded state and where power is supplied to an electromagnet 113. FIG. 16 is a cross-sectional view taken along line XVI-XVI' of FIG. 15.

Referring to FIG. 14, in order to fix the flexible display in a desired form, the shape of the flexible display panel 103 may be changed. FIG. 14 illustrates that the example of the flexible display panel 103 being folded. In an exemplary embodiment, when the shape of the flexible display panel 103 is changed, electromagnets 113 are positioned adjacent to corresponding ones of the metal plates 133. When the switch 223 is turned on after the shape of the flexible display panel 103 is changed, power is supplied to the electromagnet 113. The shape of the flexible display panel 103 may be changed in a state where the switch 223 is turned on; that is, in a state where the power is supplied to the electromagnet 113.

Referring to FIGS. 15 and 16, the flexible display may be fixed in a desired shape, for example, in a folded state. That is, electromagnet 113s, which generate magnetic forces due to the supplied power, may pull corresponding ones of the metal plates 133 to fix the flexible display panel 103 in the folded state. In the embodiment illustrated, three electromagnets 113 are provided to pull three respective metal plates 133 to fix the flexible display panel 103 in the folded state. In one embodiment, at least one electromagnet 113 may be provided to pull at least one metal plate 133 to fix the flexible display panel 103.

When the power supply to electromagnets 113 is cut off, the flexible display panel 103 may be returned to its original shape after a predetermined time elapses. That is, the flexible display may be in the state of FIG. 10 when the predetermined time elapses, after power supply to the electromagnets 113 is cut off in the state of FIG. 15.

By way of summation and review, flat panel displays have a number of drawbacks. For example, flat display devices use rigid substrates, which are capable of enduring high heat during manufacturing processes. However, these substrates add to the weight and thickness of the devices and also are not flexible.

In accordance with the foregoing embodiments, a sensor may optionally be provided to determine when the flexible display is being manipulated from the changed state back to the original state. The sensor may send a signal to cause the power to the electromagnets to be cut off, thereby assisting in returning the flexible display to the original state. Also, in any of the aforementioned embodiments, only one electromagnet and one metal plate or material may be provided to fix the flexible display in a changed state.

Also, in the aforementioned example embodiments, the changed state was discussed to be a rolled state or folded state. In other embodiments, the changed state may be any other shape where different portions of the flexible display are brought into contact with one another and held based on forces from one or more electromagnets.

Also, in the aforementioned example embodiments, the entire display area D is obscured when in the changed state. However, in alternative embodiments, a portion of the display area may be uncovered and thus viewable by a user when the flexible display is in the changed state. Also, in the folded embodiments, the flexible display is shown to have only one fold. In other embodiments, the flexible display may have multiple folds, where one edge folds over the other and is held by forces from the electromagnets. As described above, according to the foregoing embodiments, a flexible display is provided which may be stably fixed in a changed state.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible display, comprising:
a flexible display panel having a non-display area adjacent a display area, the flexible display panel including at least one electromagnet in the non-display area; and
a power supply to supply power to the at least one electromagnet when the flexible display panel is closed, wherein the flexible display panel is closed when in a rolled state and wherein the power supply is to continue supplying power to the at least one electromagnet after the flexible display panel is closed to hold the flexible display panel in a closed state.

2. The flexible display as claimed in claim 1, wherein a plurality of electromagnets are positioned in opposing first and second sides of the non-display area.

3. The flexible display as claimed in claim 2, wherein:
electromagnets positioned on the first side of the non-display area are arranged in a first line and spaced from each other,
electromagnets positioned on the second side of the non-display area are arranged in a second line and spaced from each other, and
the first line and the second line are substantially parallel to each other.

4. The flexible display as claimed in claim 2, wherein the plurality of electromagnets are symmetrically arranged relative to the display area.

5. The flexible display as claimed in claim 1, wherein the flexible display panel includes at least one metal plate positioned in the non-display area, and the electromagnet and the metal plate are positioned on different planes.

6. The flexible display as claimed in claim 5, wherein the electromagnet overlaps the metal plate.

7. The flexible display as claimed in claim 5, wherein:
when the power is supplied to the electromagnet when the flexible display panel is in the rolled state, the electromagnet generates a force to pull the metal plate to fix the flexible display panel in the rolled state.

8. The flexible display as claimed in claim 1, wherein:
the flexible display panel includes at least one metal plate positioned in the non-display area, and
the electromagnet and the metal plate are positioned on a same plane.

9. The flexible display as claimed in claim 8, wherein:
the electromagnet is positioned on one side of the non-display area, and
the metal plate is positioned on an opposing side of the non-display area.

10. The flexible display as claimed in claim 8, wherein:
when the power is supplied to the electromagnet when the flexible display panel is in a folded state, the electromagnet generates a force to pull the metal plate to fix the flexible display panel in the folded state.

11. The flexible display as claimed in claim 1, further comprising:
an electromagnet driver to drive the electromagnet,
wherein the electromagnet driver adjusts an amount of current applied to the electromagnet.

12. The flexible display as claimed in claim 1, further comprising:
a plurality of metal plates positioned in the non-display area,
wherein, when in the rolled state, at least two metal plates and at least two electromagnets are overlapped.

13. A flexible display, comprising:
a flexible display panel, the flexible display panel including a flexible substrate and a device layer on the flexible substrate, the device layer including a first device layer and a second device layer that surrounds the first device layer, the second device layer including at least one electromagnet; and
a power supply to supply power to the at least one electromagnet when the flexible display panel is closed, wherein the power supply is to continue supplying power to the at least one electromagnet after the flexible display panel is closed to hold the flexible display panel in a closed state.

14. The flexible display as claimed in claim 13, wherein:
the flexible display panel includes a non-display area around a display area,
the first device layer is positioned in the display area, and
the second device layer is positioned in the non-display area.

15. The flexible display as claimed in claim 14, wherein the flexible substrate includes a metal material.

16. The flexible display as claimed in claim 14, wherein:
the flexible display panel includes at least one metal plate positioned in the non-display area, and the metal plate is included in the flexible substrate.

17. The flexible display as claimed in claim 16, wherein:
the flexible display panel includes the flexible substrate and a barrier layer between the flexible substrate and the device layer, and
the electromagnet overlaps the metal plate.

18. The flexible display as claimed in claim 16, wherein:
the flexible display panel includes an encapsulation layer on the device layer, and
at least one of the electromagnet or the metal plate is exposed to an external surface of the flexible display panel.

19. A method for fixing a flexible display device, comprising:
changing a shape of a flexible display panel that includes at least one electromagnet; and
supplying power to the at least one electromagnet when the shape of the flexible display panel is changed to be closed, the power continuing to be supplied to the at least one electromagnet after the flexible display panel is closed to hold the flexible display panel in a closed state.

20. The method as claimed in claim 19, wherein the flexible display panel includes a non-display area around a display area, and the electromagnet is positioned in the non-display area.

21. The method as claimed in claim 19, wherein the flexible display panel includes at least one metal plate, and the changing the shape of the flexible display panel includes positioning the electromagnet to be adjacent to the metal plate that corresponds to the electromagnet.

22. A display, comprising:
a flexible substrate including a display area corresponding to a plurality of pixels;
a metal material coupled to the flexible substrate; and
at least one electromagnet coupled to the flexible substrate, the electromagnet to generate a force to attract the metal material when the flexible substrate changes from a first state to a second state, the force to assist in holding the flexible substrate in the second state, wherein the first state is an open state and the second state is a closed state and wherein the at least one electromagnet is to continue to apply the force after the flexible substrate changes to the closed state.

23. The display as claimed in claim 22, wherein the metal material is a plate.

24. The display as claimed in claim 22, wherein the metal material is included in another electromagnet.

\* \* \* \* \*